(12) United States Patent
Lor et al.

(10) Patent No.: US 10,343,298 B2
(45) Date of Patent: Jul. 9, 2019

(54) PRESS CUTTING DIE ASSEMBLY

(71) Applicant: BioCut, LLC, Milwaukee, WI (US)

(72) Inventors: Thamy Lor, Milwaukee, WI (US);
Paul Klusmeyer, Milwaukee, WI (US);
Manuel Torres, Milwaukee, WI (US);
James Carbone, Grafton, WI (US)

(73) Assignee: BioCut, LLC, Milwaukee, WI (US)

( * ) Notice: Subject to any disclaimer, the term of this patent is extended or adjusted under 35 U.S.C. 154(b) by 170 days.

(21) Appl. No.: 14/610,466

(22) Filed: Jan. 30, 2015

(65) Prior Publication Data

US 2016/0221206 A1 Aug. 4, 2016

(51) Int. Cl.
| | | |
|---|---|---|
| *B23P 15/40* | (2006.01) | |
| *B26D 3/18* | (2006.01) | |
| *B26D 7/26* | (2006.01) | |
| *B26F 1/44* | (2006.01) | |
| *B26F 1/40* | (2006.01) | |
| *B31B 50/20* | (2017.01) | |
| *B21D 37/20* | (2006.01) | |

(52) U.S. Cl.
CPC .............. *B26F 1/40* (2013.01); *B21D 37/205* (2013.01); *B26D 3/18* (2013.01); *B26D 7/2614* (2013.01); *B26F 1/44* (2013.01); *B31B 50/20* (2017.08); *B23P 15/406* (2013.01); *B26D 2007/2607* (2013.01); *B26F 2001/4436* (2013.01); *B26F 2001/4463* (2013.01); *B26F 2001/4481* (2013.01); *Y10T 83/9476* (2015.04)

(58) Field of Classification Search
CPC ..... B21D 37/20; B21D 37/205; B23P 15/406; B23P 15/24; B26F 1/384; B26F 1/40; B26F 1/44; B26F 2001/4463; B26F 2210/16; B23H 9/12; B26D 3/18; B26D 7/26; B26D 7/2614; B26D 2007/2607; B31B 50/20; B31B 50/25; B31B 50/252; Y10T 83/9476

USPC .......................... 83/698.91; 76/107.1, 107.8
See application file for complete search history.

(56) References Cited

U.S. PATENT DOCUMENTS

| | | | | |
|---|---|---|---|---|
| 2,313,801 A | * | 3/1943 | Carll ......................... | B26F 1/44 83/690 |
| 2,495,221 A | * | 1/1950 | Berlin .................. | B21D 37/205 76/107.8 |
| 2,703,023 A | * | 3/1955 | Sarno ................... | B21D 37/205 76/107.8 |
| 2,821,871 A | * | 2/1958 | Sarno ................... | B21D 37/205 76/107.8 |

(Continued)

FOREIGN PATENT DOCUMENTS

GB 1 578 124 * 11/1980 ................ B26F 1/40

*Primary Examiner* — Clark F Dexter

(57) ABSTRACT

An assembly and method of forming a press cutting die that includes a cutting blade that is supported by a blade support assembly or blade support. The blade support includes a first base portion and a second base portion that are each contoured to cooperate with one another to capture a portion of the cutting blade along an interface between the first and second base portions. Preferably, one or more keys extend between the first and second base portions and traverse the geometric plane associated with the cutting blade. Such a press cutting die is particularly applicable for cutting biologically compatible materials having a desired shape from a bulk source of the biologically compatible material.

16 Claims, 5 Drawing Sheets

(56) References Cited

U.S. PATENT DOCUMENTS

| | | | | |
|---|---|---|---|---|
| 2,939,347 A * | 6/1960 | Tobey | B21D 37/205 | 76/107.8 |
| 3,020,785 A * | 2/1962 | Leavesley et al. | B21D 37/205 | 76/107.8 |
| 3,048,069 A * | 8/1962 | Berlin et al. | B21D 45/003 | 83/123 |
| 3,120,601 A * | 2/1964 | Berlin et al. | B21D 37/205 | 219/145.21 |
| 3,152,492 A * | 10/1964 | Whitecotton | B21D 37/205 | 76/107.8 |
| 3,194,090 A * | 7/1965 | Becker | B21D 37/205 | 76/107.8 |
| 3,228,263 A * | 1/1966 | Bien | B21D 37/205 | 76/107.8 |
| 3,292,461 A * | 12/1966 | Bien | B21D 37/205 | 76/106 |
| 3,383,969 A * | 5/1968 | Saunders | B26F 1/44 | 493/340 |
| 3,587,377 A * | 6/1971 | Olson et al. | B26D 7/10 | 219/601 |
| 3,737,365 A * | 6/1973 | Smith | B26F 1/44 | 156/264 |
| 3,835,746 A * | 9/1974 | Young, Jr. et al. | B26F 1/00 | 83/346 |
| 4,226,143 A * | 10/1980 | Whitecotton et al. | B23P 15/406 | 116/307 |
| 5,140,872 A * | 8/1992 | Holliday et al. | B26F 1/44 | 219/121.67 |
| 5,211,084 A * | 5/1993 | Holliday et al. | B26F 1/44 | 219/121.67 |
| 6,626,965 B2 * | 9/2003 | Workman et al. | B26F 1/44 | 76/107.1 |
| 6,889,588 B1 * | 5/2005 | Jenkins | B26D 7/01 | 76/107.8 |

\* cited by examiner

PRESS CUTTING DIE ASSEMBLY

FIELD OF THE INVENTION

The present invention relates generally to press cutting dies and, more particularly, to a press cutting die assembly that includes at least two base sections that cooperate with one another to support a cutting blade and that is constructed of medical grade materials such that the press cutting die assembly can be used for medical applications, such as cutting graft tissue blanks from bulk materials.

BACKGROUND OF THE INVENTION

As commonly understood, skin or other tissue grafting processes commonly involve the transplanting of a section of tissue to an injury of other anatomical abnormality associated with damage to or a loss of tissue. Some grafting processes involve the transplantation of a section of tissue from one area of a patient to another area of a patient. Other grafting processes; such as allogeneic grafts (where donors and recipients are the same species), xenogeneic grafts (where donors and recipients are different species, such as porcine grafts), and prosthetic grafts (which include synthetic graft materials); can commonly be effectuated by cutting a graft from a sheet of graft material and subsequently applying the cut graft to the intended graft location. Various considerations must be addressed when forming grafts in such a manner.

One consideration to graft preparation relates to providing a sanitary condition associated with the entire process of forming each discrete tissue graft. Failure to properly attend to the sanitation of the process can result in contamination between the various devices associated with the cutting process, the blank materials, as well as already cut graft materials. Still further, inadequate attention to sanitary conditions can result in cross-contamination between already cut grafts, subsequent blank materials, and even subsequent material lots. Accordingly, devices associated with such tissue cutting processes must commonly be disposable and/or constructed to withstand periodic exposure to a suitable sanitation process to mitigate contamination between respective grafts.

Whether provided in a disposable or reusable configuration, another consideration that must be addressed during die formation is the suitability of the materials associated with forming or defining the die as being suitable for exposure to materials or tissues which are ultimately intended to be associated with and supported by a host body. That is, the die assembly and generation of the grafts preferably does not transfer materials that are ill-suited and/or dangerous for biological applications to the grafts.

Another consideration of the press cut generation of tissue grafts relates to providing a graft product that can satisfy generally uniform or repeatable size parameters. In order to press cut graft materials, a cutting edge defined by a press die must be maintained in a generally planar arrangement such that the cutting edge can pass through the graft material in a substantially orthogonal direction relative to the exposed surface plane of the material to generate grafts that are of substantially the same size and which maintain a robust graft edge for subsequent cooperation adjacent tissue of an underlying patient. Movement of the cutting edge relative to an underlying blade support or deviation of the blade during die formation and/or sterilization process can result in a die configuration that is susceptible to incomplete cut operations or undesirable cut profiles. Such shortcomings can detract from a repeatable generation of a uniform graft product and/or decrease the efficiency with which grafts can be created.

Accordingly, it would be desirable to have an assembly and method of forming a press cutting die that is formed of biologically compatible materials, is reusable or disposable, and maintains a cutting edge in a robust manner to maintain the cutting edge at an orientation that is preferably orthogonal to the plane of the tissue to which it is introduced. The present invention discloses an assembly and method of forming such a press cut die.

BRIEF DESCRIPTION OF THE INVENTION

The present invention provides a press cutting die assembly and method of forming a press cutting die that overcomes one or more of the drawbacks mentioned above. One aspect of the invention discloses a press cutting die assembly that includes a cutting blade that is supported by a blade support. The blade support includes a first base portion and a second base portion that are each contoured to cooperate with one another to capture a portion of a cutting blade along an interface between the first and second base portions. Preferably, one or more keys extend between the first and second base portions and traverse the geometric plane associated with the body of the cutting blade. Such a press cutting die is particularly applicable for cutting tissue grafts having a desired shape from bulk or black tissue graft material.

Another aspect of the invention discloses a graft tissue press cutting die assembly having at least one cutting blade that is secured to a blade support. The blade support includes a first base portion and a second base portion, that press-fittingly cooperate with one another. A recess is defined by the first base portion and the second base portion has a shape that generally matches a shape of the recess defined by the first base portion. The assembly includes at least one blade that has a cutting edge that is offset from a tissue facing side of the blade support. The blade is secured to the blade support by a portion of the at least one blade being disposed in the recess and captured between the first base portion and the second base portion. A portion of at least one of the first base portion and the second base portion traverses a plane associated with the at least one blade to provide a robust cooperation between the first and second base portions even when the blade is disposed there between.

Another aspect of the invention discloses a press cutting die assembly that includes a cutting blade that has a mount edge and a cutting edge that is formed opposite the mount edge. The assembly includes a first base portion that is formed of a polycarbonate material and defines a void, and a second base portion that is also formed of a polycarbonate material and configured to cooperate with the void defined by the first base portion such that the mount edge of the cutting blade is captured between the first base portion and the second base portion and such that the cutting edge of the blade is offset in a crossing direction from the first base portion and the second base portion. At least a portion of at least one of the first base portion and the second base portion is on opposite lateral sides of the at least one cutting blade.

A further aspect of the invention discloses a method of forming a die for press cutting surgical tissue graft material. The method includes forming a first base portion from a polycarbonate material by routing a profile in the first base portion, and forming a second base portion from a polycarbonate material by routing a generally inverse shape profile in the second base portion as compared to the profile associated with the first base portion. A cutting blade is secured relative to the first and second base portions by capturing a portion of the cutting blade between respective surfaces associated with the profile of the first base portion and the generally inverse shape profile of the second base portion.

It is appreciated that the aspects and features of the invention summarized above are not limited to any one particular embodiment of the invention. That is, many or all of the aspects above may be achieved with any particular embodiment of the invention. Those skilled in the art will appreciate that the invention may be embodied in a manner preferential to one aspect or group of aspects and advantages as taught herein. These and various other aspects, features, and advantages of the present invention will be made apparent from the following detailed description and the drawings.

BRIEF DESCRIPTION OF THE DRAWINGS

The drawings illustrate a preferred embodiment presently contemplated for carrying out the invention.

DETAILED DESCRIPTION OF THE PREFERRED EMBODIMENT

Figure 1:
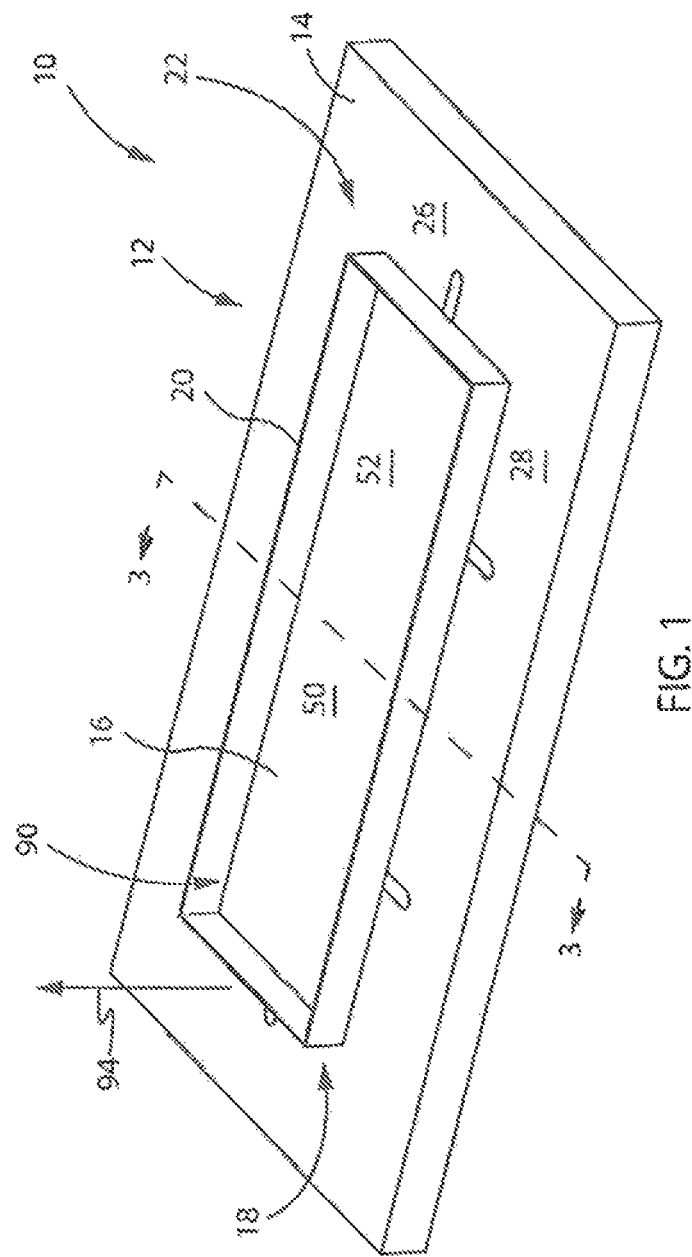
FIG. 1 is a cutting side perspective view of a press cutting die assembly according to the present invention.
Figure 2:
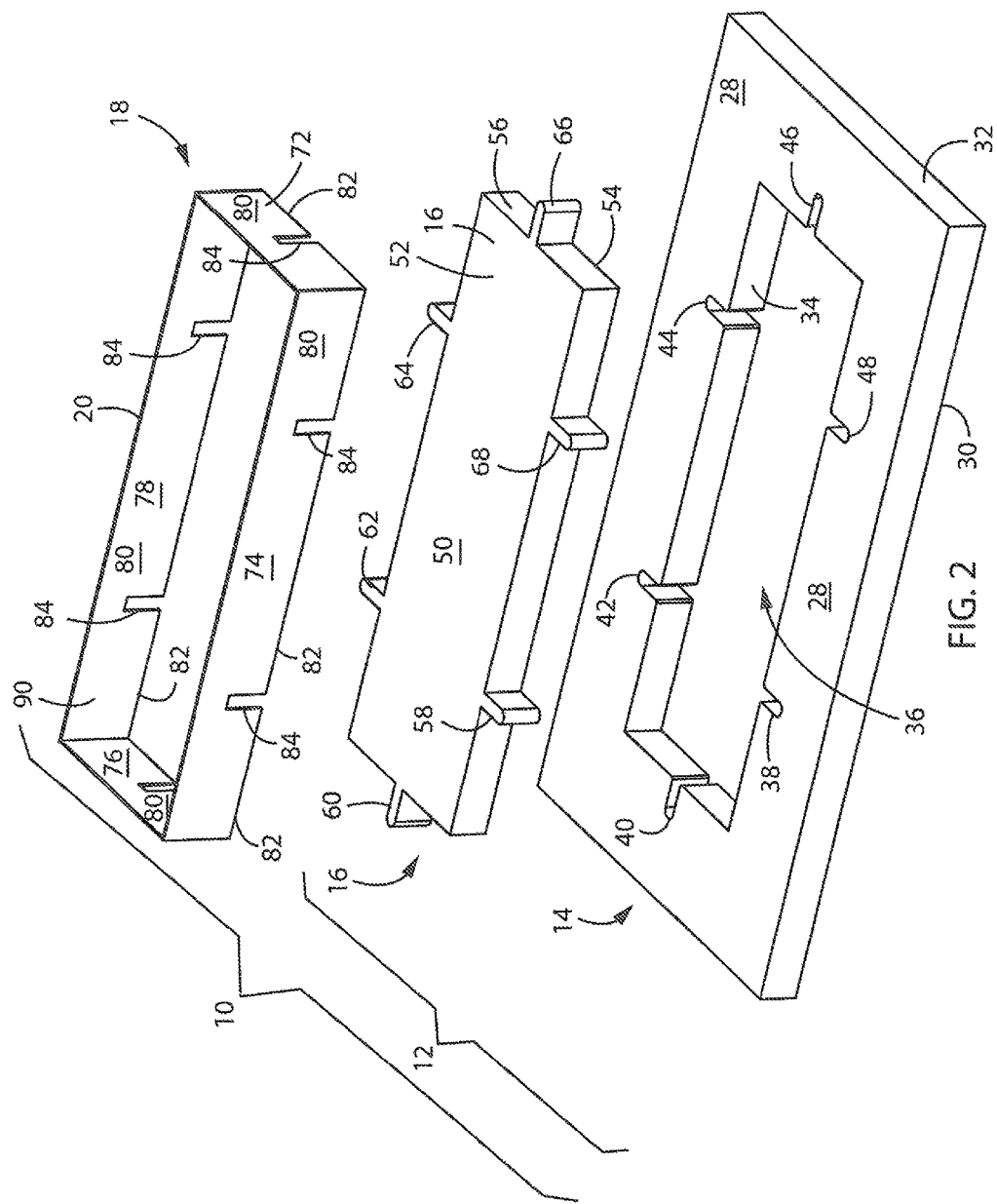
FIG. 2 is an exploded perspective view of the die assembly shown in FIG. 1.

FIG. 1 shows a press cutting die assembly 10 constructed according to the present invention. Referring to FIGS. 1 and 2, die assembly 10 includes a base assembly or blade support 12 that includes a radially outer or first base portion 14 and a radially inner or second base portion 16. A cutting blade, knife, or simply a blade 18 is constructed to cooperate with blade support 12 such that a cutting edge 20 defined by blade 18 is oriented above or is offset from a material or upward facing surface 22 of base assembly 12. In various environments, blade 18 is commonly referred to as a steel rule die as one example of forming blade 18 and defining the cut profile. The shape and orientation of cutting edge 20 generally defines the shape, profile, or footprint of the material intended to be cut by die assembly 10. Although shown as having a generally rectilinear shaped cut profile, it is appreciated that die assembly 10 could be provided in virtually any shape.

Still referring to FIGS. 1 and 2, first base portion 14 is defined by a body 26 that includes a first or material facing side 28, an opposite or second side 30, an outer perimeter edge 32, and an inner perimeter edge 34. Perimeter edges 32, 34 extend between sides 28, 30 of body 26. Edge 34 defines a void or a cavity 36 or a recess that is generally circumferentially bounded by body 26 of first base portion 14. Cavity 36 includes one or more channels or keyways 38, 40, 42, 44, 46, 48 that extend between sides 28, 30 of body 26. Preferably, the shape or profile associated with perimeter 34 and keyways 38, 40, 42, 44, 46, 48 is oriented to extend in an orthogonal direction relative to at least one of sides 28, 30 of body 26. In a preferred embodiment, the profile or shape of cavity 36 is routed, formed by computer numerical control (CNC) operations, laser cut, or otherwise machined into body 26 during formation of first base portion 14 of die assembly 10.

Second base portion 16 is also defined by a body 50 that includes a first side 52 and the second side 54 that are bounded by a perimeter edge 56. First and second base portions 14, 16 are each formed of biologically or medically suitable materials or materials suitable for periodic exposure to biologic materials. Preferably, one or both of first and second base portions 14, 16, are formed from a polycarbonate material. More preferably, first and second base portions 14, 16 are formed of the same polycarbonate material, such as Lexan® for example. It is appreciated that Lexan® materials, Delrin® materials, and Kynar® materials are but a few examples of such bio-compatible materials. Preferably, base portions 14, 16 are formed of a material that is workable so as to accommodate the formation of keys and keyways as disclosed below, temperature and impact resistant to accommodate use of die assembly 10 in medical and press cutting environments and applications, cost effective so as to accommodate periodic replacement of the die assembly, and formed of materials that are suitable for exposure to and/or contact with biological materials.

As shown in FIG. 2, and regardless of the material associated with the formation of base portions 14, 16, body 50 includes a number of projections or keys 58, 60, 62, 64, 66, 68 that extend in generally outward radial directions relative to perimeter 56 of body 50. As explained further below, each of keys 58, 60, 62, 64, 66, 68 is constructed to cooperate with a respective keyway 38, 40, 42, 44, 46, 48 associated with first base portion 14 when second base portion 16 is engaged therewith. Preferably, body 26 and body 50 of first and second base portions 14, 16 have the same thickness such that blade support 12 has a generally planar shape when the base portions 14, 16 are fully engaged with one another and with the profiles associated therewith formed by at least any of the manufacturing methodologies disclosed above.

It is further appreciated that the number, orientation, and shape of the respective key/keyway structures, the respective projecting and receiving structures or contours, between the respective portions 14, 16 of the blade support 12 can be provided in any number of configurations aside from that which is shown in FIGS. 1 and 2. For instance, each of the plurality of keys/keyways may have respectively similar shapes and sizes or may be configured in different shapes and sizes. It is further appreciated that the spacing between respective key/keyway associations can be provided in any number of configurations. It is further appreciated that the various keys and various keyways need not be associated with only one of the respective base portions. That is, it is envisioned that one base portion can include a number of keys and keyways and a corresponding base portion can include the inverse orientation and number of respective keys and keyways. As disclosed further below, at least one of the respective alternate base portions preferably includes at least one projection such that respective portions of the respective base portion are disposed on alternate lateral sides of the plane that contains the respective cutting blade. Such considerations allow the first and second base portions 14, 16 to index relative to one another, cooperate with one another in a secure manner, and in a manner wherein the cutting blade can be securely captured between facing structures of the respective base portions 14, 16.

It is further appreciated that although each of the key/keyway engagements between first base portion 14 and second base portion 16 are shown as having a generally rectilinear shape that terminates in a radial direction with a rounded end portion, other configurations, such as a dovetail cooperation, more rounded, circular, cylindrical, or rectilinear shaped profiles are envisioned. Further, although cavity 36 associated with first base portion 14 is shown as a through hole, or an opening that extends through the entirety of body 26, it is further appreciated that cavity 36 could be configured as a blind hole or a configuration wherein cavity 36 does not extend entirely through first base portion 14, but remains constructed to receive second base portion 16. It is further appreciated that alternate shapes, such as stepped cavities, are also envisioned.

Still referring to FIGS. 1 and 2, cutting blade 18 can be constructed as a unitary body or be provided as a number of discrete blade sections 72, 74, 76, 78 wherein each blade section is defined by a body 80 that extends in a cutting direction between a respective cutting edge 20 and a respective mount edge 82. Each respective blade section 72, 74, 76, 78 can include one or more cavities or cutouts 84 that extend into the respective blade body 80 from mount edge 82. Said in another way, cutouts 84 extend through the respective body 80 when considered in a direction that is transverse to the cutting direction. As disclosed further below, the respective blade sections 72, 74, 76, 78 include cutouts 84 that are sized, shaped, oriented, and in a number sufficient to allow the respective blade section to cooperate with the key/keyway structure associated with the desired side of the blade support 12.

Cutouts 84 are constructed and oriented to cooperate with respective keys 58, 60, 62, 64, 66, 68 associated with second base portion 16 when die assembly 10 is assembled. As disclosed above, it is appreciated that cutting blade 18 can be formed from a number of discrete blade sections or formed in a desired shape as a unitary blade body. Regardless of the number of blade sections, cutting edge 20 associated with blade 18 preferably fully circumscribes a cut area 90 that is located radially inboard of cutting edge 20 so as to generally overlie surface 52 of second base portion 16. Referring briefly back to FIG. 1, when assembled, surface 28 of first base portion 14 and surface 52 of second base portion 16 are preferably coplanar relative to one another and oriented such that cutting edge 20 associated with blade 18 is offset in an orthogonal direction, indicated by arrow 94, relative to surface 22 of base assembly 12. Said in another way, cutting edge 20 is oriented above surface 22 of base assembly 12.

Figure 3:
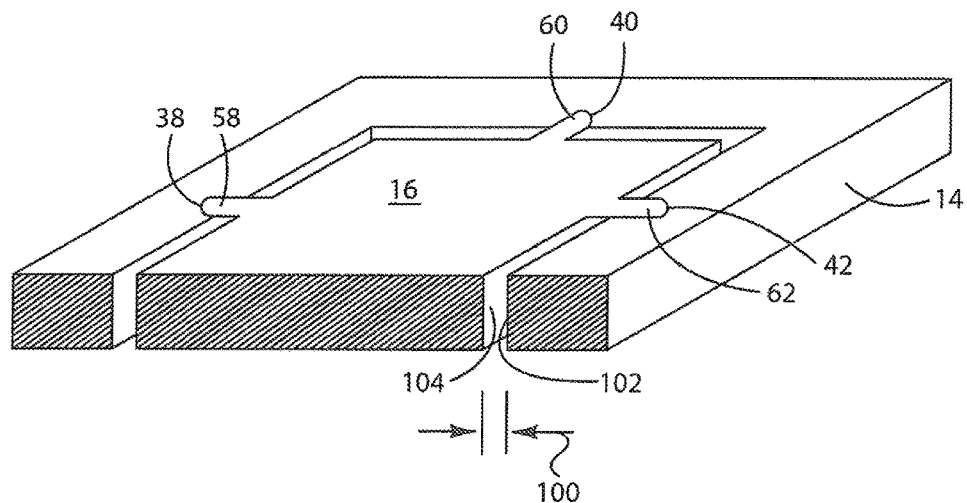
FIG. 3 is a perspective cross section view of the die assembly taken along line 3-3 shown in FIG. 1.

Referring to FIG. 3, when first base portion 14 and second base portion 16 are associated with one another, the various keys 58, 60, 62 and corresponding keyways 38, 40, 42 cooperate with one another to define a gap, indicated by dimension 100, that extends generally circumferentially between a profile or an interface 102 associated with first base portion 14 and a profile or an interface 104 associated with second base portion 16. Gap 100 is shaped to press-fittingly cooperate with mount end 82 of body 80 of respective blade section 72, 74, 76, 78 associated therewith. Said in another way, gap 100 has a thickness that is less than the thickness associated with the respective portions of cutting blade 18 such that cutting blade 18 can be securely captured between first base portion 14 and second base portion 16 when die assembly 10 is fully assembled.

Figure 4:
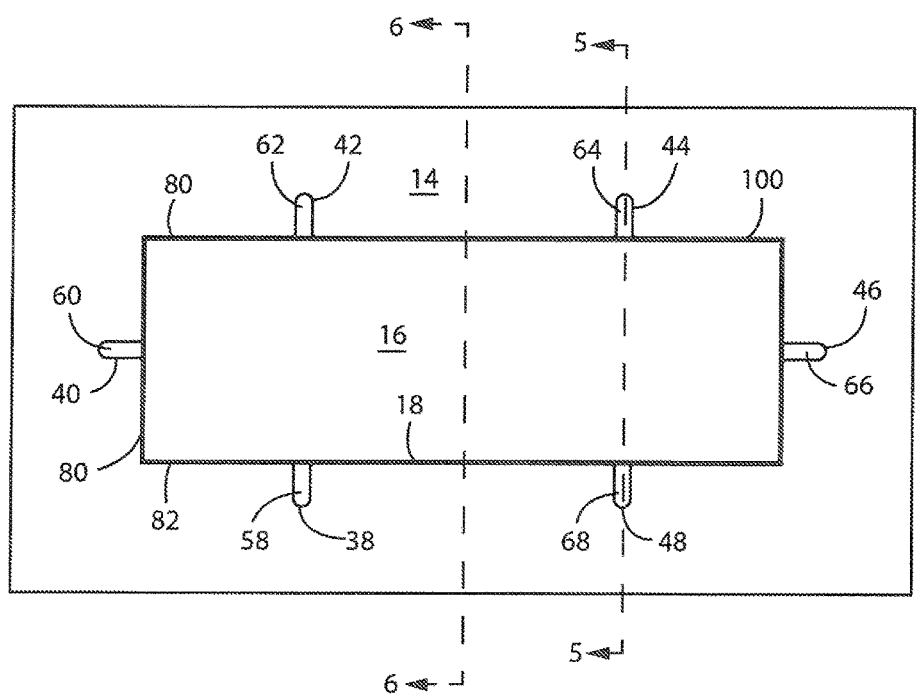
FIG. 4 is a plan view of the assembly shown in FIG. 1.
Figure 5:
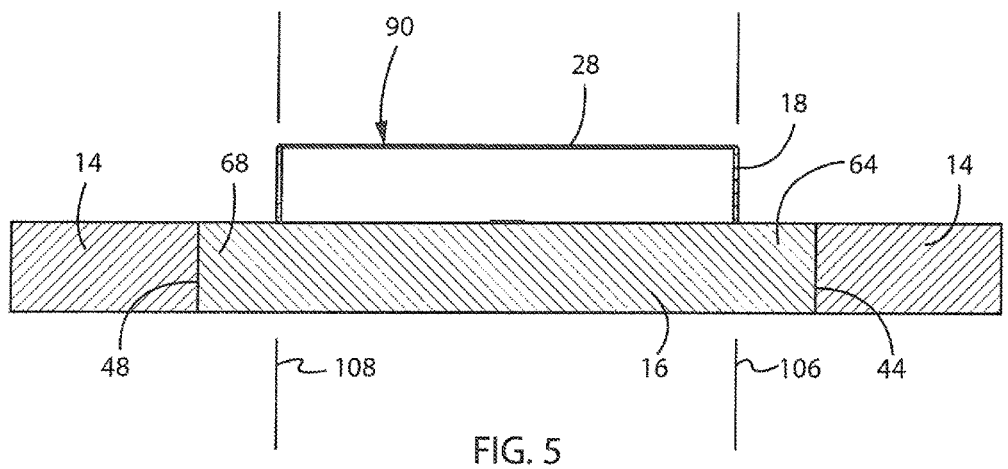
FIG. 5 is an elevational cross section view of the die assembly shown in FIG. 1 taken along line 5-5 shown in FIG. 4.
Figure 6:
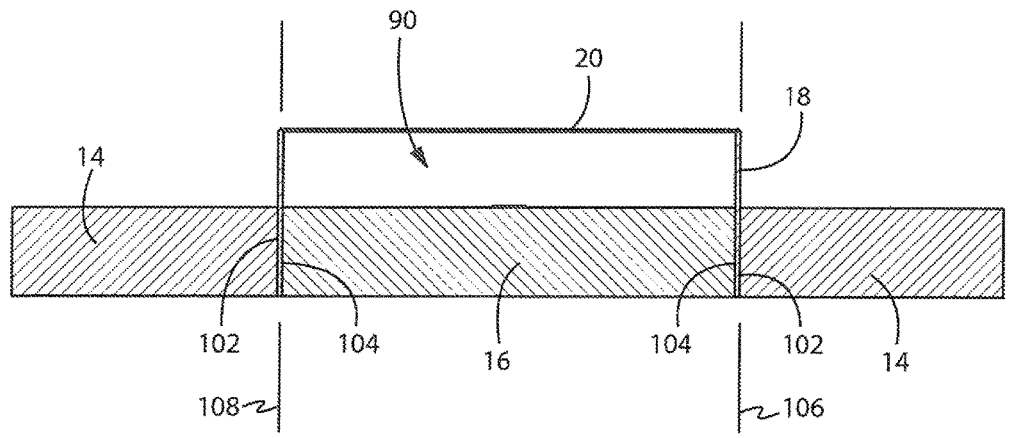
FIG. 6 is an elevational cross section view similar to FIG. 5 and taken along line 6-6 shown therein.

As should be appreciated from FIGS. 3-6, the radially outward directed projection of keys 58, 60, 62, 64, 66, 68 relative to cutting blade 18 results of the construction wherein the portion of second base portion 16 associated with the respective keys traverses at least one of the geometric planes, indicated by lines 106, 108 in FIGS. 5 and 6, and which would be normal to the view shown in FIG. 4, associated with each of the respective portions of cutting blade 18. Said in another way, respective portions of second base portion 16 of blade support 12 are disposed on generally opposite sides of blade 18. Understandably, were the orientation of keyways, 38, 40, 42, 44, 46, 48 and keys 58, 60, 62, 64, 66, 68 reversed or otherwise changed with respect to being associated with a respective one of first base portion 14 or second base portion 16, it is envisioned that one or both of first base portion 14 and second base portion 16 could be constructed to traverse one or more of the planes 106, 108 associated with cutting blade 18. Regardless of the specific key/keyway cooperation between the first and second base portions 14, 16 of blade support 12, it is envisioned that the respective base portions cooperate in a manner wherein the base portions securely cooperate with the cutting blade and secure the cutting blade, or the respective sections thereof, relative to the base to facilitate repeated use of the cutting die assembly 10 for press cutting operations. It is further appreciated that press cutting operations associated with utilization of die assembly 10 can be effectuated by any of pneumatic, hydraulic, manual, crank, or lever press cutting operations.

Figure 7:
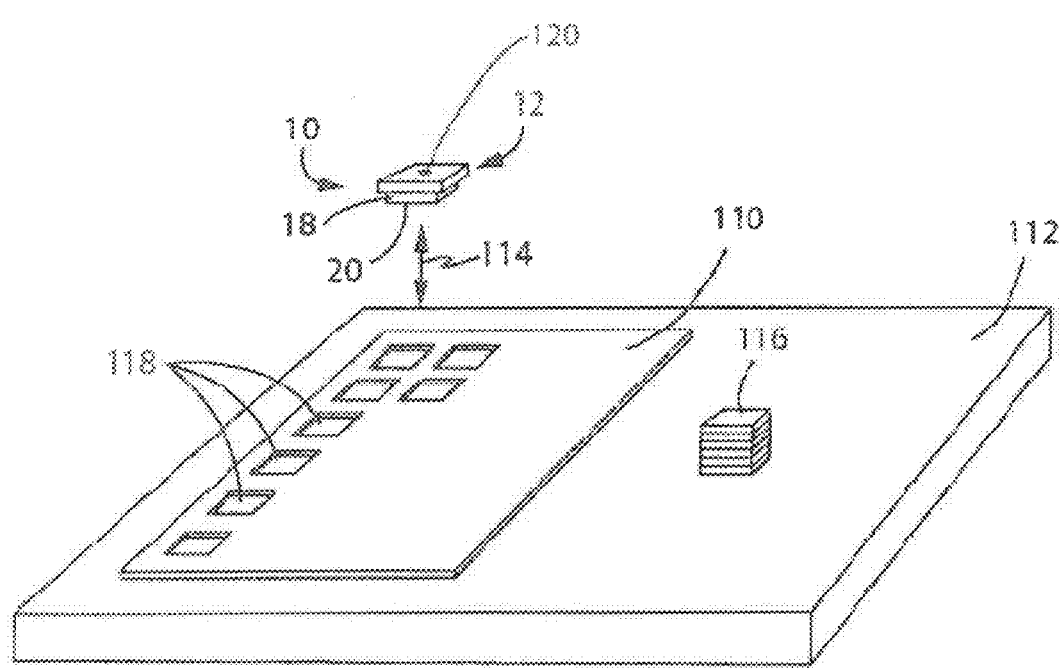
FIG. 7 is a perspective view of a graft cutting process effectuated with the cutting die assembly shown in FIG. 1.

FIG. 7 shows an exemplary press cutting process associated with die assembly 10. As shown in FIG. 7, during press cutting operations, a blank material, such as a graft material 110, is associated with a platen or other support structure 112. Each introduction of the cutting edge 20 of die assembly 10 to the graft material 110, and downward translation of the same, indicated by arrow 114, cuts a respective graft 116 from the sheet material 110 and leaves a cutout 118 associated with each graft 116 that is removed from the material 110. It should be appreciated that the shape of die assembly 10, and particularly the cutting edge associated therewith, will commonly dictate the most efficient consumption or usage of the blank material 110 to generate the desired grafts 116 therefrom. Although suitable for cutting grafts 116, it is further appreciated that die assembly 10 can be utilized to cut various other materials such as bandages, human or other animal organs, as well as other materials used in medical environments such as wet bandages, wet gauzes, placentas, etc.

Die assembly 10 is constructed to accommodate the accumulation of successive grafts 116 within cut cavity 90 although it is envisioned that each graft 116 can be removed from cavity 90 prior to the cutting of a successive graft. It is appreciated that blade support 12 can include one or more ejection ports or openings 120 disposed within the perimeter of cutting blade 18 and shaped to cooperate with an ejector (not shown) for removing cut grafts from die assembly 10. It is further appreciated that grafts 116 can be removed manually from cut cavity 90 or extracted in other manners, such as via a blower or vacuum extraction, to remove the cut grafts 116 from cut cavity 90. Preferably, blade 18 is orthogonal to blade support 12 and cutting edge 20 is preferably maintained in a plane that is parallel to blade support 12 such that each graft cutting operation results in a circumferential severing of the cut graft 116 from bulk material 110. Such a consideration reduces the potential that a supplemental cut operation will be required to effectuate full separation between the respective grafts from the bulk graft material.

The indexing cooperation between the respective portions 14, 16 of blade support 12 and the robust interaction between blade support 12 and cutting blade 18 provides a press cutting die assembly that can be economically produced, is robust, and does not adversely affect the sanitation of the materials to which it is applied. The die assembly is robust enough to tolerate subsequent sanitation and disinfectant processes and economically producible so as to tolerate periodic disposal and replacement of the die assembly.

Therefore, one embodiment of the invention includes a press cutting die assembly that includes a cutting blade that is supported by a blade support. The blade support includes a first base portion and a second base portion that are each contoured to cooperate with one another to capture a portion of the cutting blade along an interface between the first and second base portions. Preferably, one or more keys extend between the first and second base portions and traverse the geometric plane associated with the cutting blade. Such a press cutting die is particularly applicable for cutting tissue grafts having a desired shape from tissue graft material.

Another embodiment of the invention includes a graft tissue press cutting die assembly having at least one cutting blade that is secured to a blade support. The blade support includes a first base portion and a second base portion that press-fittingly cooperate with one another. A recess is defined by the first base portion, and the second base portion has a shape that generally matches a shape of the recess defined by the first base portion. The assembly includes at least one blade that has a cutting edge that is offset from a tissue facing side of the blade support. The blade is secured to the blade support by a portion of the at least one blade being disposed in the recess and captured between the first base portion and the second base portion. A portion of at least one of the first base portion and the second base portion traverses a plane associated with the at least one blade to provide a robust cooperation between the first and second base portions even when the blade is disposed there between.

Another embodiment of the invention discloses a press cutting die assembly. The assembly includes a cutting blade that has a mount edge and a cutting edge that is formed opposite the mount edge. The assembly includes a first base portion that is formed of a polycarbonate material and defines a void, and a second base portion that is also formed of a polycarbonate material and configured to cooperate with the void defined by the first base portion such that the mount edge of the cutting blade is captured between the first base portion and the second base portion such that the cutting edge of the blade is offset in a crossing direction from the first base portion and the second base portion. At least a portion of at least one of the first base portion and the second base portion is on opposite lateral sides of the at least one cutting blade.

A further embodiment of the invention includes a method of forming a die for press cutting surgical tissue graft material. The method includes forming a first base portion from a polycarbonate material by routing a profile in the first base portion, and forming a second base portion from a polycarbonate material by routing a generally inverse shape profile in the second base portion as compared to the profile associated with the first base portion. A cutting blade is secured relative to the first and second base portions by capturing a portion of the cutting blade between respective surfaces associated with the profile of the first base portion and the generally inverse shape profile of the second base portion.

The present invention has been described in terms of the preferred embodiments, and it is recognized that equivalents, alternatives, and modifications, aside from those expressly stated, are possible and within the scope of the appending claims. It is further appreciated that the respective features of any one of the embodiments discussed above is not necessarily solely exclusive thereto.

What is claimed is:

1. A press cutting die assembly, the assembly comprising:
   a blade support that comprises:
      a first base portion with at least one keyway;
      a recess defined by the first base portion; and
      a second base portion disposed in the recess and having at least one key corresponding to the at least one keyway, the second base portion separate from the first base portion and having a shape that generally matches a shape of the recess defined by the first base portion; and
   at least one blade having a cutting edge, which is offset from a material facing side of the blade support, and a mount edge, which contains at least one notch corresponding to the at least one key, the at least one blade secured to the blade support by a portion of the mount edge of the at least one blade being disposed in the recess and captured between the first base portion and the second base portion;
   wherein the at least one key passes through the at least one notch and into one of the at least one keyway.

2. The assembly of claim 1 wherein the at least one blade is further defined as a plurality of blades that cooperate with one another to circumscribe at least a portion of the recess.

3. The assembly of claim 2 further comprising an ejection port formed through at least one of the first base portion and the second base portion within a boundary of the plurality of blades.

4. The assembly of claim 1 wherein at least one of the first base portion and the second base portion are formed of a polycarbonate material.

5. The assembly of claim 1 wherein the first base portion and the second base portion are formed of the same material.

6. A press cutting die assembly comprising:
   at least one cutting blade having a mount edge and a cutting edge formed opposite the mount edge, the mount edge containing at least one notch;
   a first base portion with at least one key corresponding to the at least one notch, the first base portion formed of a material and defining a void; and
   a second base portion disposed in the void and having at least one keyway corresponding to the at least one key of the first base portion, wherein the second base portion is separate from the first base portion and formed of the material, the second base portion cooperating with the void defined by the first base portion such that the mount edge of the at least one cutting blade is captured between the first base portion and the second base portion and such that the cutting edge is offset in a crossing direction from the first base portion and the second base portion, and the at least one key of the first base portion extends through the at least one notch of the cutting blade into one of the at least one key way in the second base portion.

7. The assembly of claim 6 wherein the void is further defined as at least one of a through hole and a blind hole.

8. The assembly of claim 6 wherein portions of the void are on opposite lateral sides of the at least one cutting blade, and portions of the at least one key of the second base portion are on opposite lateral sides of the at least one cutting blade.

9. The assembly of claim 8 further comprising a plurality of said portions of the void are on opposite lateral sides of the at least one cutting blade, and wherein said at least one key is a plurality of keys such that portions of each of the plurality keys of the second base portion are on opposite lateral sides of the at least one cutting blade, wherein the portions of the void and the plurality of keys are spaced about a perimeter interface between the first base portion and the second base portion.

10. The assembly of claim 6 wherein the at least one cutting blade is further defined as a plurality of cutting blades wherein each cutting blade includes a respective portion of the mount edge captured between the first base portion of the second base portion, and the plurality of cutting blades cooperate with one another such that the cutting edge fully circumscribes a cut area.

11. The assembly of claim 6 wherein the at least one cutting blade is captured between the first base portion and the second base portion in a press-fit manner.

12. The assembly of claim 6 wherein the at least one notch is further defined as a plurality of notches in the at least one cutting blade.

13. A method of forming a die for press cutting biological material, the method comprising:
   forming a first base portion having a profile with at least one keyway;
   forming a second base portion that is separate from the first base portion, the second base portion having a generally inverse shape profile as compared to the profile of the first base portion, wherein the second base portion contains at least one key corresponding to the at least one keyway; and
   securing a cutting blade to the first and second base portions by capturing a portion of the cutting blade between respective surfaces of the profile of the first base portion and the generally inverse shape profile of the second base portion and wherein the cutting blade further comprises a notch in the cutting blade corresponding to each of the at least one key, each notch being offset from a cutting edge defined by the cutting blade, each key of the at least one key passing through the corresponding notch and into a corresponding one of the at least one keyway defined by the first base portion.

14. The method of claim 13 further comprising pressing the first base portion and the second base portion into engagement with one another to capture the cutting blade between the respective surfaces associated with the profile of the first base portion and the generally inverse shape profile of the second base portion.

15. The method of claim 13 wherein securing the cutting blade relative to the first and second base portions is further defined as securing a plurality of blade sections relative to the first and second base portions by capturing a portion of each of the plurality of blade sections between respective surfaces of the profile of the first base portion and the generally inverse shape profile of the second base portion to define a continuous closed loop cut perimeter.

16. A method of forming a press cutting die, the method comprising:
   forming a first base portion having a profile;
   forming a second base portion that is separate from the first base portion, the second base portion having a generally inverse shape profile as compared to the profile of the first base portion;
   forming at least one keyway in one of the first base portion and the second base portion and forming at least one key in the other of the first base portion and the second base portion such that the at least one key is shaped to cooperate with the at least one keyway;
   providing a cutting blade having at least one notch therein, the at least one notch corresponding to the at least one key, the at least one notch is offset from a cutting edge defined by the cutting blade; and
   securing the cutting blade to the first and second base portions by capturing a portion of the cutting blade between respective surfaces of the profile of the first base portion and the generally inverse shape profile of the second base portion, wherein the at least one key extends through the corresponding notch into a corresponding one of the at least one keyway.

* * * * *